B. B. LANG
Potato-Diggers.
No. 217,622.  Patented July 15, 1879.
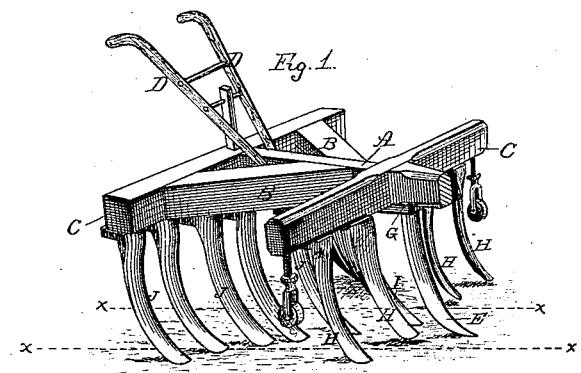
Fig. 1.
Fig. 2.
Witnesses:
J. W. Garner
W. S. D. Haines
Inventor:
B. B. Lang,
per
C. E. Allen, atty.

UNITED STATES PATENT OFFICE.

BERNARD B. LANG, OF SOUTH BURLINGTON, VERMONT.

IMPROVEMENT IN POTATO-DIGGERS.

Specification forming part of Letters Patent No. 217,622, dated July 15, 1879; application filed February 20, 1879.

*To all whom it may concern:*

Be it known that I, BERNARD B. LANG, of South Burlington, in the county of Chittenden and State of Vermont, have invented certain new and useful Improvements in Potato-Diggers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to an improvement in potato-diggers; and it consists, first, in the combination of two sets of teeth, the front ones of which are shorter than the rear ones, and are used for the purpose of clearing away the tops of the potatoes; second, in the arrangement of the rear set of teeth, whereby the potatoes are carried off to each side of the row, as will be more fully described hereinafter.

In the accompanying drawings, which illustrate my invention, Figure 1 is a perspective view of my invention. Fig. 2 is a cross-section of one of the teeth.

The frame of my machine consists of a central beam, A, the two beams C, running at right angles thereto, and the two diagonal beams B, secured to both the rear beam, C, and the central beam, A, as shown. Upon the top of the frame thus formed are secured suitable handles D, for the management of the machine.

To the front end of the central beam, A, just under or a little in advance of the cross-beam C, is secured a long tooth, E, which is made sharp on its front edge and widest at its rear side, as shown. The upper portion of this tooth, where it is secured to the beam, is provided with suitable vertical flanges G, for the purpose of enabling it to straddle over the edges of the beam, and thus be more securely held in position.

Upon each side of this central beam, A, and secured to the under side of the beam C, are two or more teeth, H, which are considerably shorter than the central tooth, and which are beveled from their inner edges toward their outer edges, so as to make these teeth triangular in cross-section, as shown. The lower ends of these teeth H are made flat, sharp-pointed, and curved forward, so that they will cut away the potato-tops and the weeds before the teeth which are to dig the potatoes from the ground come into play. These teeth are thus beveled off toward their outer edges and made triangular in shape, so that as the machine moves forward all weeds and tops of potatoes will be moved outward toward the side of the row.

Secured to the under side of the central beam, A, just in the rear of the long tooth E, is a second tooth, I, similar in shape and construction; and secured to the under side of the diagonal beams B is a series of teeth, J, all of which are considerably longer than the teeth H, just described, but otherwise are made of the same shape. These teeth J are so arranged as to be much nearer to each other than the teeth H, and the last two teeth of the series are made to extend outward beyond the outer one of the teeth H, as shown. These teeth being placed so near together, whatever is started by one tooth is started outward, owing to the triangular shape of the teeth, and then is passed along from tooth to tooth until the last one of the series throws it out beyond the row.

As this machine is made sufficiently wide to take in the widest row, it will readily be seen that not only are the tops first cut away, but that the potatoes, however deep they may grow, or however far they may have stretched out on the sides, will be dug up and deposited in a line on the outside of the row.

As the rear set of teeth extend outward beyond the front set, H, this last tooth will carry the potatoes out upon the tops of the weeds, and leave them upon the top of the earth, ready to be gathered up.

Having thus described my invention, I claim—

1. In a potato-digger, the combination of two separate and independent sets of teeth, the front ones of which are made shorter than the rear ones, so as to clear away the tops of the potatoes, substantially as shown.

2. In a potato-digger, the combination of a series of teeth, H, arranged relatively, as shown, with a series of teeth, J, each tooth being made triangular in cross-section, so as to carry the potatoes out to the side of the row, substantially as described.

3. In a potato-digger, the combination of the two sets of triangular teeth H J, the teeth J being made to extend outward beyond the teeth H on both sides of the machine, so as to throw the potatoes out beyond the row, substantially as set forth.

In testimony that I claim the foregoing as my own I do affix my signature in presence of two witnesses.

BERNARD B. LANG.

Witnesses:
 CHARLES E. ALLEN,
 GEO. H. G. HENREUX.